March 31, 1959 M. PAGE 2,879,685
MUSICAL SQUEEZE BLOCKS
Filed May 31, 1955
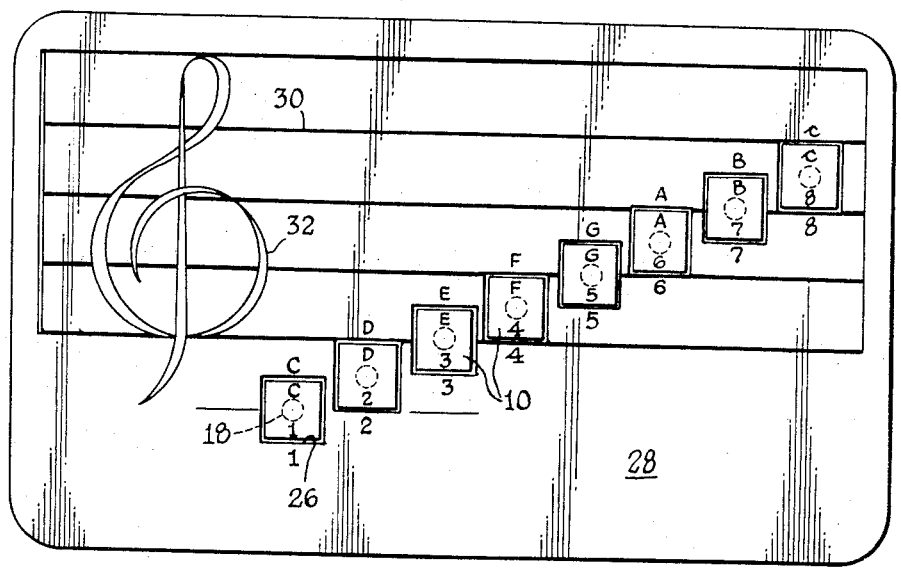
Fig. 1.
Fig. 2.
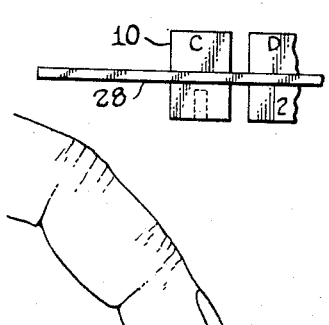
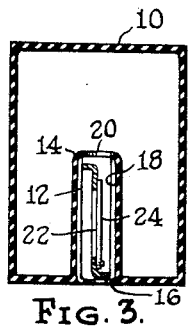
Fig. 3.
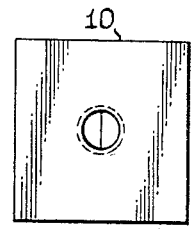
Fig. 4.
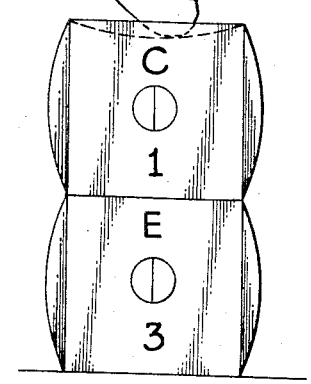
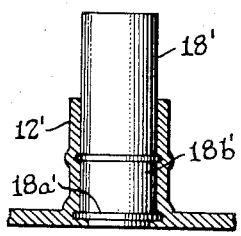
Fig. 5.
Fig. 6.
INVENTOR
MARK PAGE.
BY
Paul S. Martin
ATTORNEY

United States Patent Office 2,879,685
Patented Mar. 31, 1959

2,879,685

MUSICAL SQUEEZE BLOCKS

Mark Page, Great Neck, N.Y.

Application May 31, 1955, Serial No. 511,891

3 Claims. (Cl. 84—470)

The present invention relates to educational devices and to toys.

An object of this invention is to provide novel toy building blocks, more particularly a novel set of musical building blocks.

A further object resides in the provision of an aid to the learning of music reading.

As will be seen below, the preferred embodiment of the invention utilizes the same musical devices in achieving the foregoing objects. The illustrative embodiment described includes a wind-actuated tone source in each of a set of blocks that have rubber-like walls. Each block of the set is tuned to a separate pitch, related to the others according to the tones of a scale. A tone is generated simply by squeezing a block, and the blocks can be squeezed in sequence and in combinations to play music.

Each tone-generator is a unit which is assembled to a support member that holds it in position, this support also bearing the lines and a signature of music. The tone units are located respectively on the line or in the space corresponding to the pitch each produces.

Squeeze-blocks incorporating tuned reeds have the important advantage of being useful apart from the support described; and of functioning in a further educational manner when a child proceeds to restore each unit to its proper place on the staff. The blocks bear letters designating their respective tones, and the musical staff member has corresponding letters adjacent a series of recesses to show where each squeeze-block belongs.

The nature of the invention will be better appreciated from the following detailed description of a presently preferred but illustrative embodiment, shown in the accompanying drawings forming part of this disclosure.

In the drawings:

Fig. 1 is a plan view of an illustrative embodiment of the invention, and Fig. 2 is a fragmentary elevation thereof;

Fig. 3 is a vertical cross-section of a squeeze-block constituting a novel subcombination of the embodiment in Fig. 1, and Fig. 4 is a bottom view of the device in Fig. 3;

Fig. 5 is a fragmentary cross-section of a modification of the device in Figs. 3 and 4; and Fig. 6 is an elevation of a further application of the individual squeeze-blocks in Figs. 1, 3 and 4.

Referring now to Figs. 3 and 4, there is seen a hollow block 10 of rectangular cross-section having a thin rubber-like wall that is readily deformed under pressure but which returns to its original shape immediately upon release. Integral with the wall of the block is a tube 12 of the same material as the wall, tube 12 having openings at its extremities, and each extremity having an in-turned lip 14, 16.

A tuned reed of known design is retained in tube 12, this reed including a metal cylinder 18 having rounded ends engaged by in-turned lips 14 and 16 and held in place by those lips. Within tube 18 is a metal member 20 which extends generally longitudinally of tube 18 and which, with oppositely directed offset end portions, divides the passage of tube 18 in two. Member 20 has an opening 22 that permits passage of air between the space within the block and the exterior, and a reed 24, secured at its lower end in Fig. 3, extends across opening 22. Reed 24 is on the side of member 20 that vibrates and produces a musical tone when air is forced from the inside of the block to the outside, and air passes reed 24 silently when block 10 restores itself to initial shape after having been squeezed.

Block 10 may be formed in various ways. In a method of special merit a charge of a suitable fluid polymer may be placed in a hollow mold having a solid insert of the same shape as tube 18, and the mold may be rocked and rotated to coat the entire wall of the mold and the mold insert with the material. The tipping and rotating is advantageously continued while the mold is heated to polymerizing temperature, and thus the liquid polymer is caused to solidify to a rubbery state. By suitable techniques the hole outlined by lip 14 is left open. The hole at lip 16 is naturally formed by the mold insert.

A tuned reed of the form in Fig. 3 is next forced into molded tube 12. It is there held in place by lips 14 and 16. The use of a cement might be desired to guarantee permanent assembly of the tuned reed within tube 12. Alternatively, lips 14 and 16 may be wholly relied upon to retain the reed in the position shown.

In Fig. 5 a modified form of tuned reed designated 18' is shown in a block like that of Figs. 3 and 4, reed 18' having an end flange 18a' and a rib 18b'. Appropriate recesses are formed in the tube 12' corresponding to tube 12 of Fig. 3, these recesses being complementary to flange 18a' and rib 18b'. The tuned reed is forcibly inserted into tube 12' where it is naturally retained by the complementary forms of the passage in the molded tube and the exterior of the reed. If desired, the structure of Fig. 5 may be more permanently united as an assembly through the use of an appropriate cement to bond the tuned reed in place within molded tube 12'.

In Figs. 1 and 2 there appears an assembly of a set of musical blocks 10 all of the same construction as in Figs. 3 and 4, but which differ each from the others by having tuned reeds related according to the notes of a scale. In Figs. 1 and 2, blocks 10 are received snugly in square openings 26 in a support-card 28. Blocks 10 project above member 28 and they extend below member 28 so as to be reliably retained in position. Not only are the reeds of blocks 10 related to each other according to the standard notes of a musical scale, but the blocks are identified by the letters representing notes of a scale, in this instance the notes of the "C" scale, C, D, E, F, G, A, B, c, and by the numerals 1–8, to designate their sequence in the scale. They are further individually colored distinctively as a further representation of their tones. Corresponding indicia appear on the card (letters, numbers and color) adjacent each block, to guide their reinsertion after removal. Member 28 has imprinted thereon the lines 30 of a musical staff, and a G-clef 32. Blocks 10 are located at the proper lines and spaces according to the notes they represent.

Each block 10 will emit a musical tone when squeezed, and it is evident that they can be squeezed in any sequence necessary to reproduce a tune without disturbing their assembly to member 28. The musical squeeze-blocks convey to the user the representation of their tones in various ways: by number, by letter, by color; and accordingly music can be written in any and all of these symbols. A series of colored spots can be used to dictate the sequence of blocks to be squeezed. A series of numbers can similarly represent a tune. A series of letters can likewise represent a tune. A series of distinctive colored numbers and letters is also effective. However a prominent educational feature of the present invention resides in the assembly of blocks 10 in the positions in card 28 of the musical staff 28, 30 where the notes appear in conventionally written music. The assembly of the blocks 10 in or on a device that bears the musical staff as in Fig. 1 makes it quickly understood, even by young children, that a note on conventionally written music can be reproduced by squeezing the block in the corresponding position of the staff of card 28. The tunes of conventionally written music are reproduced by squeezing the blocks, successively, that are in positions corresponding to the notes that appear in conventionally written music.

The "C" scale has been employed in the device shown in the drawings. It might be considered preferable to have a set of blocks arranged in a scale where "A" is the #1 block, according to the alphabet. This change is naturally within the contemplation of this invention. The "C" scale used in the illustration avoids the complication of sharps or flats that would be required, technically, for an "A" scale.

To children, the novel squeeze-blocks are fascinating and educational in still further aspects. They can be used after the manner of conventional building blocks. They are an aid in teaching numerals and letters. In Fig. 6 there is shown still a further pleasing and educational application of these blocks. Two or more select blocks can be piled up or otherwise assembled. When multiple blocks are squeezed as an assembly, a chord will be produced; if the selected combination is bad, a dischord will result.

It is apparent that an educational and fascinating set of musical squeeze blocks and assembly of musical devices with a musical signature support has been provided in the illustrative embodiment. The underlying concepts are naturally susceptible to a latitude of modification, as will occur to those skilled in the art. Accordingly the appended claims should be broadly construed, consistent with the spirit and scope of the invention.

What I claim is:

1. An educational musical device including a member having a musical staff and signature thereon, said member having a series of openings at the successive positions of an octave on the staff, and an octave of squeeze-blocks whose walls are of rubber-like material removably received in said openings and having wind-actuated tone generators therein, the several blocks being adapted to emit the tones of a scale, respectively, upon being squeezed.

2. An educational musical device including a member having a musical staff and signature thereon, said member having a series of openings at the successive positions of an octave on the staff, and an octave of squeeze-blocks whose walls are of rubber-like material removably received by said openings and having wind-actuated tone generators therein, the several blocks being adapted to emit the tones of a scale, respectively, upon being squeezed, each block bearing distinctive means of identification of the note it emits when squeezed, and the staff bearing corresponding means of identification adjacent each of said openings, respectively.

3. An educational musical device including a member having a substantially flat portion bearing a musical staff and signature thereon, said portion having a series of square openings at the successive positions of an octave on the staff, and an octave of hollow cubic squeeze-blocks whose walls are of rubber-like material removably received in said openings and having wind-actuated tone generators therein, the several blocks being adapted to emit the tones of a scale, respectively, upon being squeezed, said blocks bearing distinctive indicia corresponding to the respective notes they emit when squeezed, and the staff bearing corresponding indicia adjacent said openings, respectively.

References Cited in the file of this patent
UNITED STATES PATENTS

| | | |
|---|---|---|
| 620,087 | Stein | Feb. 21, 1899 |
| 672,678 | Kitching | Apr. 23, 1901 |
| 1,392,766 | Huth | Oct. 4, 1921 |
| 1,772,394 | Hanselmann | Aug. 5, 1930 |
| 2,315,793 | Jay | Apr. 6, 1943 |